United States Patent
Gruber

(10) Patent No.: US 8,147,794 B2
(45) Date of Patent: Apr. 3, 2012

(54) MULTI-STAGE METHOD FOR MANUFACTURING TITANIUM DIOXIDE

(75) Inventor: Rainer Gruber, Leverkusen (DE)

(73) Assignee: Kronos International, Inc., Leverkusen (DE)

( * ) Notice: Subject to any disclaimer, the term of this patent is extended or adjusted under 35 U.S.C. 154(b) by 94 days.

(21) Appl. No.: 12/706,039

(22) Filed: Feb. 16, 2010

(65) Prior Publication Data

US 2010/0215569 A1    Aug. 26, 2010

Related U.S. Application Data

(60) Provisional application No. 61/154,166, filed on Feb. 20, 2009.

(30) Foreign Application Priority Data

Feb. 20, 2009   (DE) .................. 10 2009 009 780

(51) Int. Cl.
  *C01G 23/07*   (2006.01)
  *C01G 23/047*  (2006.01)
  *C09C 1/36*    (2006.01)

(52) U.S. Cl. ................ 423/613; 423/612; 106/437

(58) Field of Classification Search .......... 423/610–613; 106/437
See application file for complete search history.

(56) References Cited

U.S. PATENT DOCUMENTS

| | | | |
|---|---|---|---|
| 3,615,202 A | | 10/1971 | Stern et al. |
| 4,241,042 A | * | 12/1980 | Matijevic et al. ............. 423/610 |
| 6,387,347 B1 | | 5/2002 | Deberry et al. |
| 2007/0172414 A1 | | 7/2007 | Subramanian et al. |
| 2008/0003152 A1 | * | 1/2008 | Fait et al. .................. 423/69 |
| 2008/0075654 A1 | | 3/2008 | Jamison |

FOREIGN PATENT DOCUMENTS

| | | |
|---|---|---|
| EP | 0427878 | 11/1989 |
| EP | 0583063 | 7/1993 |
| GB | 969618 | 9/1964 |
| WO | WO 98/04500 | 2/1998 |
| WO | WO 01/60748 | 8/2001 |

* cited by examiner

*Primary Examiner* — Steven Bos
*Assistant Examiner* — Diana J Liao
(74) *Attorney, Agent, or Firm* — Locke Lord, LLP

(57) ABSTRACT

The invention relates to manufacturing titanium dioxide by oxidizing titanium tetrachloride by a multi-stage method, where liquid titanium tetrachloride is used in a first and gaseous titanium tetrachloride is used in a second stage. The process is energetically more favorable and offers the possibility, to a certain extent, of controlling the mean particle size of the end product.

18 Claims, No Drawings

MULTI-STAGE METHOD FOR MANUFACTURING TITANIUM DIOXIDE

RELATED APPLICATIONS

This application claims the benefit of U.S. Provisional Patent Application Ser. No. 61/154,166 filed Feb. 20, 2009, and entitled "Multistage Method for Manufacturing Titanium Dioxide" and the benefit of DE 10 2009 0097805 filed Feb. 20, 2009.

TECHNICAL FIELD

The invention relates to manufacturing titanium dioxide by oxidising titanium tetrachloride by a multi-stage method, where liquid titanium tetrachloride is used in the first stage.

BACKGROUND

In one of the commercially applied methods for manufacturing titanium dioxide pigment particles, the so-called chloride process, titanium tetrachloride ($TiCl_4$) is reacted with an oxidising gas, such as oxygen, air, etc., and with specific additives in a tubular reactor to obtain titanium dioxide and chlorine gas:

$$TiCl_4 + O_2 \rightarrow TiO_2 + 2Cl_2$$

The $TiO_2$ particles are subsequently separated from the chlorine gas. Known additives are $AlCl_3$ as a rutiliser, and steam or alkali salts as nucleating agents.

This process is usually performed in a single stage, as described in U.S. Pat. No. 3,615,202 or EP 0 427 878 B1, for example. This kind of reaction is, however, energetically unsatisfactory because, owing to the high activation energy of $TiCl_4$ oxidation, the educts have to be preheated to such a degree that an adiabatic mixed temperature of the educts of approx. 800° C. is reached before the onset of the reaction in order for the reaction to take place completely. However, the oxidation reaction is highly exothermal, meaning that, following complete, adiabatic conversion, the temperature of the product stream is roughly 900° C. higher than that of the educts. Before the $TiO_2$ particles are separated from the gaseous reaction products with the help of a filter, this mixture has to be substantially cooled in a cooling section in order to avoid damage to the filter.

For the purpose of energetic optimisation, multi-stage versions of the chloride process have therefore been developed, in which only part of the educts is heated and added to a first stage. The rest of the educts is added to the second stage after just slight heating, or even without heating. There, the educts are heated by the reaction enthalpy released in the first stage, in turn reacting themselves. $TiCl_4$ alone or $TiCl_4$ and oxygen can be added to the second stage. In addition to a second stage, it is furthermore possible to provide further stages using slightly heated or cold educts.

For example, EP 0 583 063 B1 describes the two-stage introduction of $TiCl_4$ into the reactor. $TiCl_4$ with a temperature of at least 450° C. and mixed with $AlCl_3$ is fed into the hot oxygen stream at a first inlet, and with a temperature of 350° C. to 400° C. and without $AlCl_3$ at a further inlet.

The method according to EP 0 852 568 B1 makes provision for not only the $TiCl_4$ to be added in two stages, but also the oxygen. The objective of this method is effective control of the mean $TiO_2$ particle size, and thus of the tone of the $TiO_2$ pigment base material. In this case, $TiCl_4$ vapour with a temperature of roughly 400° C. is initially introduced into an oxygen stream with a temperature of roughly 950° C. Formation of the $TiO_2$ particles and particle growth take place in the downstream reaction zone. Less highly heated $TiCl_4$ vapour (approx. 180° C.) is added at a second inlet. Oxygen with a temperature between 25° C. and 1,040° C. is introduced at the second inlet, the temperature of the mixture being sufficient to initiate the reaction.

The multi-stage method according to U.S. Pat. No. 6,387,347 B1 is additionally designed to reduce the formation of agglomerates. To this end, the previously heated $TiCl_4$ stream is divided into two split streams before addition to the reactor. One split stream (about 60%) is oxidised in the first stage of the reactor, the second split stream (about 40%) being cooled (de-superheated) by injecting liquid $TiCl_4$ and then added to the reactor. De-superheating takes place outside the reactor, where the temperature does not drop below the condensation temperature of the overall stream.

A similar method for manufacturing $TiO_2$ is described by US 2008/0075654 A1. This patent application comprises the technical teaching that the particle size of the $TiO_2$ product may be decreased by lowering the entrance temperature of the second $TiCl_4$ split stream. The effect is increased if the entrance temperature of the second $TiCl_4$ split stream is lower than the entrance temperature of the first $TiCl_4$ split stream and the effect is decreased if the temperature ratio is other way around (see examples 1 and 4).

US 2007/0172414 A1 discloses a multi-stage method for reacting $TiCl_4$ and $O_2$, where gaseous $TiCl_4$ is fed into the reactor in the first stage, and liquid $TiCl_4$ in the second stage. This method permits energy savings and improvement of the particle size range.

The common feature of all these processes is that the educts fed into the first stage are highly heated. The first stage is thus operated with highly heated oxygen and heated, vaporous $TiCl_4$. One disadvantage of this form of the multi-stage reaction is, however, that the mean particle size increases with the proportion of educts in the second and subsequent stages. This effect can probably be explained as follows: two competing reaction pathways are possible when reacting $TiCl_4$ and oxygen. On the one hand, $TiCl_4$ and $O_2$ can react with each other directly in the gas phase (homogeneous gas-phase reaction), as a result of which $TiO_2$ molecules are formed that grow into particles by colliding and sintering with each other. On the other hand, $TiCl_4$ can attach itself to the surface of existing $TiO_2$ particles and react with oxygen there to form $TiO_2$. This second reaction pathway does not lead to the formation of new particles, but to an increase in the size of existing particles (surface reaction).

The former mechanism is favoured in the single-stage oxidation reaction, because virtually no particles are present at the time of reaction of the $TiCl_4$ and the $O_2$. In the two-stage and multi-stage reaction, however, unburned $TiCl_4$ is added to a stream of $TiO_2$ particles, meaning that the reaction mechanism shifts in favour of the surface reaction in comparison with the single-stage reaction. The result is an increase in the mean particle size. The velocity of the surface reaction may be decreased so that the mean particle size increases to a lesser degree by lowering the temperature of the reactants ($TiCl_4$, $O_2$) in one split stream by de-superheating—as described in U.S. Pat. No. 6,387,347 B1 and US 2008/0075654 A1. Yet, in the end the increase of the mean particle size must be counteracted by increased addition of KCl or another growth inhibitor. However, these inhibitors are highly corrosive, resulting in increased corrosion of the equipment and a greater maintenance effort.

SUMMARY OF THE INVENTION

The object of the present invention is to create a multi-stage method for manufacturing titanium dioxide by oxidising titanium tetrachloride, that is energetically favourable and overcomes the aforementioned disadvantages of the known methods.

The object is solved by a multi-stage method for manufacturing titanium dioxide particles by reacting titanium tetrachloride with an oxygen-containing gas in a tubular reactor, characterised in that liquid $TiCl_4$ is fed into a preheated, oxygen-containing gas stream in a first stage, where the molar ratio of $O_2:TiCl_4$ is greater than 1 and a gas suspension containing initial $TiO_2$ particles is formed, and gaseous $TiCl_4$ is fed into the gas suspension containing the initial $TiO_2$ particles in a second stage.

DESCRIPTION OF PREFERRED EMBODIMENTS

The method according to the invention differs from the known multi-stage chloride processes for manufacturing titanium dioxide in that the $TiCl_4$ is introduced into the oxidation reactor in liquid form in a first stage and in gaseous form in a second stage. In the first stage, the liquid $TiCl_4$ is reacted with an excess of preheated oxygen, as a result of which the liquid $TiCl_4$ ignites even in cold form without preheating. Due to the excess of oxygen, only very fine $TiO_2$ particles are formed in the reaction zone of the first stage, then functioning as nuclei for particle growth in the subsequent stages.

The second stage of the oxidation process is operated like a conventional first stage, where heated, gaseous $TiCl_4$ is introduced into the hot, oxygen-containing gas stream in the reactor.

The molar ratio of $O_2:TiCl_4$ in the first stage is more than 1, preferably at least 10 and particularly 20 to 200.

In the first stage at most 20% of the total $TiCl_4$ quantity is dosed, preferably at most 10% and more preferably at most 2%. The total $TiCl_4$ being the total $TiCl_4$ fed into all stages of the reactor.

The method according to the invention can also encompass a third and, where appropriate, further process stages. It is furthermore possible to introduce $TiCl_4$ in liquid form in the third stage, or in one or more further stages. It is moreover possible, following the first stage, to additionally introduce oxygen-containing gas in at least one of the further stages. Beyond this, the oxygen-containing gas introduced in at least one of the further stages can be unheated gas with a temperature of roughly 25° C. In this context, attention must be paid to ensuring that all the $TiCl_4$ added is reacted into $TiO_2$.

Compared to conventional two-stage or multi-stage oxidation of $TiCl_4$, the particles formed by the method according to the invention are finer. In the conventional multi-stage methods like e.g. US 2008/0075654 A1 the $TiO_2$ particle size is influenced by a thermal effect in that the surface growth of the $TiO_2$ particles is slowed down by a lower temperature. Yet the present method is characterized in that in the first stage only nuclei are formed which act as seed crystals in the second oxidation stage. The smaller particle size is possibly also favoured by the fact that the injected $TiCl_4$ droplets are more homogeneously mixed into the oxygen-containing gas stream than a $TiCl_4$ gas, as a result of which a homogeneous gas-phase reaction can increasingly take place.

The method according to the invention offers the possibility, to a certain extent, of controlling the mean particle size of the end product by setting the quantity of liquid $TiCl_4$ in the first stage. Compared to conventional methods, precise setting of a particular particle size then requires no KCl or other growth inhibitor, or at least a smaller quantity. This also reduces the maintenance effort for the reactor facility.

EXAMPLES

The following examples are intended for further explanation of the invention and are not intended to restrict the invention in any way.

Example 1

To manufacture 10 t/h $TiO_2$ pigment, 3,500 $Nm^3$/h oxygen are heated to 1,650° C. and fed into a tubular reactor. Approx. 250 kg/h liquid $TiCl_4$ are injected into the oxygen stream. The $TiCl_4$ reacts with a small proportion of the oxygen, forming very fine $TiO_2$ and chlorine gas. The mixture of oxygen, chlorine and $TiO_2$ is passed into a second section of the tubular reactor, into which 24 t/h gaseous $TiCl_4$ with a temperature of 450° C. are introduced. A quantity of 1.5% by weight $AlCl_3$ is admixed into this $TiCl_4$ stream. The $TiCl_4$—$AlCl_3$ gas stream reacts with the hot oxygen, forming $TiO_2$ and chlorine gas, where the $TiO_2$ from the first stage serves as a nucleating agent. A $TiO_2$ sufficiently fine for use as a white pigment is obtained in this way, even without adding a further growth inhibitor.

Example 2

To manufacture 10 t/h $TiO_2$ pigment, 2,800 $Nm^3$/h oxygen are heated to 1,650° C. and fed into a tubular reactor. Approx. 200 kg/h liquid $TiCl_4$ are injected into the oxygen stream. The $TiCl_4$ reacts with a small proportion of the oxygen, forming very fine $TiO_2$ and chlorine gas. The mixture of oxygen, chlorine and $TiO_2$ is passed into a second section of the tubular reactor, into which 12 t/h gaseous $TiCl_4$ with a temperature of 450° C. are introduced. A quantity of 1.5% by weight $AlCl_3$ is admixed into this $TiCl_4$ stream. The $TiCl_4$—$AlCl_3$ gas stream reacts with the hot oxygen, forming $TiO_2$ and chlorine gas, where the $TiO_2$ from the first stage serves as a nucleating agent.

The mixture of gas and $TiO_2$ is passed into a third section of the tubular reactor, where 700 $Nm^3$/h unheated oxygen with a temperature of roughly 25° C. and 12 t/h liquid $TiCl_4$ are injected consecutively. These two streams are heated by the gas-solid stream from the second stage and react to form $TiO_2$ and chlorine gas. A $TiO_2$ sufficiently fine for use as a white pigment is obtained in this way, even without adding a further growth inhibitor.

Compared to Example 1, the embodiment in this example is particularly advantageous in that it saves energy because only part of the oxygen and $TiCl_4$ requires preheating. The oxygen and $TiCl_4$ streams added in the third section of the reactor are heated with the help of the heat of reaction released in stages 1 and 2.

The above description of certain embodiments are made for purposes of illustration only and are not intended to be limiting in any manner. Other alterations and modifications of the preferred embodiments will become apparent to those of ordinary skill in the art upon reading this disclosure, and it is intended that the scope of the invention disclosed herein be limited only by the broadest interpretation of the appended claims to which the inventor is legally entitled.

The invention claimed is:

1. A method for manufacturing titanium dioxide particles by reacting titanium tetrachloride with an $O_2$ containing gas in a tubular reactor using a multi-stage method comprising:
   feeding liquid $TiCl_4$ into a preheated, $O_2$-containing gas stream in a first stage of a reactor to form a gas suspension containing initial $TiO_2$ particles;
   wherein the molar ratio of $O_2:TiCl_4$ in the first stage is greater than about 1; and
   feeding gaseous $TiCl_4$ into the gas suspension in a second stage of the reactor.

2. The method of claim 1, wherein the molar ratio of $O_2:TiCl_4$ in the first stage is at least 10.

3. The method of claim 1, wherein the molar ratio of $O_2:TiCl_4$ in the first stage is from about 20 to about 200.

4. The method of claim 1, wherein the reactor has one or more further stages after the second stage and gaseous or liquid $TiCl_4$ is introduced into at least one of the one or more further stages.

5. The method of claim 1 further comprising introducing an $O_2$-containing gas into at least one stage following the first stage.

6. The method of claim 5 wherein the $O_2$-containing gas introduced into at least one stage following the first stage is unheated.

7. The method of claim 1, wherein the liquid $TiCl_4$ fed into the first stage is at most about 20% of total $TiCl_4$ fed into all the stages of the reactor.

8. The method of claim 7, wherein the molar ratio of $O_2:TiCl_4$ in the first stage is from about 20 to about 200.

9. The method of claim 7, wherein the reactor has one or more further stages after the second stage and gaseous or liquid $TiCl_4$ is introduced into at least one of the one or more further stages.

10. The method of claim 7 further comprising introducing an unheated $O_2$-containing gas into at least one stage following the first stage.

11. The method of claim 1, wherein the liquid $TiCl_4$ fed into the first stage is at most about 10% of total $TiCl_4$ fed into all the stages of the reactor.

12. The method of claim 11, wherein the molar ratio of $O_2:TiCl_4$ in the first stage is from about 20 to about 200.

13. The method of claim 11, wherein the reactor has one or more further stages after the second stage and gaseous or liquid $TiCl_4$ is introduced into at least one of the one or more further stages.

14. The method of claim 11 further comprising introducing an unheated $O_2$-containing gas into at least one stage following the first stage.

15. The method of claim 1, wherein the liquid $TiCl_4$ fed into the first stage is at most about 2% of total $TiCl_4$ fed into all the stages of the reactor.

16. The method of claim 15, wherein the molar ratio of $O_2:TiCl_4$ in the first stage is from about 20 to about 200.

17. The method of claim 15, wherein the reactor has one or more further stages after the second stage and gaseous or liquid $TiCl_4$ is introduced into at least one of the one or more further stages.

18. The method of claim 15 further comprising introducing an unheated $O_2$-containing gas into at least one stage following the first stage.

* * * * *